(12) United States Patent
Cox et al.

(10) Patent No.: US 10,207,798 B2
(45) Date of Patent: Feb. 19, 2019

(54) METHOD FOR REDUCING AIRCRAFT TURNAROUND TIME BY IMPROVING RAMP SAFETY

(71) Applicant: Borealis Technical Limited, North Plains, OR (US)

(72) Inventors: Isaiah W. Cox, London (GB); Rodney T. Cox, North Plains, OR (US)

(73) Assignee: Borealis Technical Limited, Gibraltar (GI)

( * ) Notice: Subject to any disclaimer, the term of this patent is extended or adjusted under 35 U.S.C. 154(b) by 0 days.

(21) Appl. No.: 15/889,910

(22) Filed: Feb. 6, 2018

(65) Prior Publication Data
US 2018/0201366 A1     Jul. 19, 2018

Related U.S. Application Data

(62) Division of application No. 13/416,614, filed on Mar. 9, 2012, now Pat. No. 9,914,530.

(60) Provisional application No. 61/451,590, filed on Mar. 10, 2011.

(51) Int. Cl.
| | |
|---|---|
| *B64C 25/40* | (2006.01) |
| *B64F 1/00* | (2006.01) |
| *B64F 1/305* | (2006.01) |

(52) U.S. Cl.
CPC .............. *B64C 25/405* (2013.01); *B64F 1/00* (2013.01); *B64F 1/3055* (2013.01); *Y02T 50/823* (2013.01)

(58) Field of Classification Search
CPC ................................ B64C 1/24; B64C 25/405
See application file for complete search history.

(56) References Cited

U.S. PATENT DOCUMENTS 9,771,148 B2 *   9/2017   Cox ...................... B64C 25/405

\* cited by examiner

*Primary Examiner* — Brian M O'Hara

(57) ABSTRACT

A method for reducing aircraft turnaround time by improving airport ramp safety is provided. The method minimizes the time interval between an aircraft's landing and takeoff by independently moving the aircraft on the ground without the aircraft's engines by eliminating hazards from jet blast, the possibility of engine ingestion, and the time previously required to wait in the gate area upon arrival or at departure until jet blast or engine ingestion did not pose a danger. Turnaround time is further reduced by providing an onboard driver controllable to drive at least one of the aircraft's wheels between landing and takeoff, thereby eliminating the need for a tow vehicle and the time required to move the aircraft with a tow vehicle.

11 Claims, 2 Drawing Sheets

METHOD FOR REDUCING AIRCRAFT TURNAROUND TIME BY IMPROVING RAMP SAFETY

PRIORITY CLAIM

This application is a divisional of U.S. patent application Ser. No. 13/416,614, filed Mar. 9, 2012, which claims priority from U.S. Provisional Patent Application No. 61/451,590, filed Mar. 9, 2011, the disclosures of which are fully incorporated herein.

TECHNICAL FIELD

The present invention relates generally to methods for reducing the time between arrival and departure of an aircraft known as the turnaround time and specifically to a method for reducing the turnaround time by improving ramp safety.

BACKGROUND OF THE INVENTION

The operation of airlines and airports today focuses on achieving maximum efficiency to keep operating costs as low as possible while continuing to provide travelers with a safe and economical mode of travel. It is desired to keep the time an aircraft spends on the ground at an airport between arrival at and departure from the gate to the minimum required to unload arriving passengers and cargo, service the aircraft, and load departing passengers and cargo. Minimizing this turnaround time not only reduces delays in airline flight schedules, but also increases the possibility that an airline can schedule additional flights, providing travelers with more options and improving airline profits. Increased aircraft ground traffic, however, may be accompanied by an increased risk of ground incidents involving aircraft, ground vehicles, and even passengers and ground personnel. Consequently, reducing aircraft turnaround time should not be at the expense of increased ground safety risks.

The ramp area of an airport typically includes the jetway or airbridge and the ground area around where aircraft park between arrival and departure adjacent to the terminal. The ramp entry or exit area, which is the area adjacent to a taxiway and leading to or from an airline's ramp is, according to some studies, the location of most ground incidents. At this location, taxi lines leading into and out of the gate area converge, and an aircraft is less likely to be in communication with air traffic or other controllers. Flight crew are more likely at this point to be relying on an airline's ramp control procedure or ground crew input for guidance. The largest percentage of incidents in one study occurred within 20 feet of the nose wheel parking line, within the gate stop area, when the flight crew is typically relying entirely on ground crew guidance and signals from ground crew or elsewhere for clearance from obstacles and for final taxi instructions. Increased ramp congestion may be exacerbated by inadequate numbers of ground personnel, leading to the likelihood of increased ramp incidents.

One study found that more incidents occur during aircraft arrival than during departure. One possible explanation for this is that there may be more obstacles for an aircraft to encounter when entering the congested area next to gates and terminal buildings. Another reason may be related to the large number of pushback, power-out, and power-turn procedures that are conducted during departure operations while arriving aircraft are entering the ramp area.

While damage caused by aircraft to ground equipment and service vehicles may account for most of the reported ramp incidents, damage to other aircraft, especially where taxiing aircraft share a common maneuvering area, and injuries to people, mainly ground personnel but occasionally passengers, can account for a significant number of additional incidents. The personal injuries notwithstanding, the financial and other losses to an airline from such incidents are potentially substantial.

In addition to ramp collision incidents such as those described above, ramp safety, and ground safety generally, can be significantly compromised by the jet blast from an aircraft jet engine, as well as by the potential for engine ingestion when aircraft engines are kept in operation, even at idle speeds, within the ramp area. Ramp congestion caused by increasing numbers of flights, stringent aircraft scheduling requirements, and efforts to squeeze large jets into gates originally designed for much smaller aircraft contributes to traffic jams and reduced maneuvering space in the ramp area. The addition of jet blast, also known as jet efflux, from aircraft taxiing into a congested ramp area with one or more engines operating virtually guarantees that something will be damaged or someone will be injured.

Jet blast data, measured from the tail with the engines at low RPM settings, indicates that the damage profile can extend from the outboard wing-mounted engines to more than 200 feet beyond some larger aircraft. Within this area, jet engines can generate hurricane-level exhaust forces of almost 100 knots. Most of the reported jet blast damage incidents typically occur in the ramp area during pushback, power back, taxi-out, or taxi-in. The position of the operating jet engines relative to gates, ground equipment, people, and other aircraft, especially smaller light aircraft, can significantly influence the occurrence of jet blast damage incidents when breakaway power is applied. Aircraft with engines powered and in the process of turning are frequently involved in jet blast damage incidents. Using powered engines to maneuver an aircraft without assistance from a tractor or tug is highly likely to compromise ramp and ground safety. The presence of a tractor or tug, however, is not likely to prevent jet blast damage if the aircraft's engines are running and the aircraft is in the process of making a sharp turn. Careful management of an engine-powered aircraft moving on the ground is required to prevent jet blast damage, particularly on congested ramps not designed for large aircraft.

Positioning a jet aircraft so that the forward thrust is directed away from gate areas, people, and ramp equipment and the jet blast is not directed into the gate area is helpful, but the direction of the jet blast can change as the aircraft is maneuvered into or out of the gate. This occurs, for example, during power back operations, when the flight crew employs engine thrust reversers to direct thrust ahead of the aircraft to push the aircraft backward, changing the direction of the jet blast. Damage to other aircraft, especially small aircraft, ground vehicles, and personnel remains a distinct possibility as long as an aircraft's engines are running.

Suggestions for preventing jet blast damage thus far have been limited to, for example, avoiding sharp turns on taxi-in or pushback with one or more engines running, and using tractors or tugs to move taxiing aircraft. Improving ground crew vigilance, communication, and the handling of ground vehicles, as well as parking small commuter aircraft in locations away from jet aircraft have also been recommended. These suggestions may reduce damage from jet blast. As long as jet aircraft continue to operate their engines while the aircraft are on the ground, however, jet blast continues to be a hazard.

Another hazard posed by aircraft engines operating in the ramp area, especially at or near the gate, is the potential that engine ingestion could occur. The operation of a jet engine creates a low pressure area in the engine inlet, which causes a large quantity of air from the area forward of the inlet cowl to move into the engine. The velocity of the air nearest the inlet is much greater than the velocity of the air farther from the inlet. As a result, the amount of engine suction close to the inlet is significant and may be high enough to pull tools, equipment, and even people into the engine. To avoid the possibility of serious injury or, in rare cases, death, it is necessary for ground personnel and ground vehicles to keep a safe distance from an operating aircraft engine. The hazard or danger zone around one type of aircraft with an engine operating just above idle power is within a radius of about 9 feet (2.7 m) from the center of the engine and about 4 feet (1.2 m) back toward the engine cowl. This hazard zone increases to a radius of about 13 feet (4 m) and a distance toward the cowl of about 5 feet (1.5 m) when the aircraft engine is operating above idle power. At higher power levels, the hazard zone increases to at least 100 feet (m) in front of the engines and at least 200 feet (m) behind the engines. The extent of the engine ingestion hazard zone may be increased by wind or weather conditions. Where the engine ingestion hazard zone ends in the vicinity of the engine cowl, the exhaust hazard area begins, and damage or injury from jet blast hazard is possible. The danger of aircraft turbines, whether they are pure jet engines or turboprop engines, cannot be overstated.

Even after the aircraft engine is shut off completely, the possibility of engine ingestion may exist for a period of about 30 seconds. The risk of engine ingestion to a person standing in front of an engine the size of a 737 NG engine that has just been turned off is extremely high. Hazard warning stripes and other indicia are typically painted on the engine cowl to warn ground personnel of the potential danger. Some airline operators have painted engine inlet hazard zones on the tarmac at aircraft parking locations. This will be effective only if the aircraft is parked accurately within the hazard zone. Crowded conditions in ramp gate areas further increase the possibility for engine ingestion damage or injury. Engine ingestion damage or injury at or near an airport gate area can be completely avoided only when the aircraft engines are shut down and remain off.

A system and method for reducing turnaround time of an aircraft is described in U.S. Patent Application Publication No. US 2008/0059053 (now U.S. Pat. No. 7,891,609) to Cox et al, owned in common with the present application. The system and method described therein suggests that aircraft turbines may be turned on only when needed for takeoff or prior to landing and are turned off until takeoff or after landing. The aircraft is moved along taxiways using at least one self propelled undercarriage wheel. This method focuses on reducing turnaround times by having all of the required equipment available for turnaround and departure and minimizing the use of motorized tugs while providing an enhanced communication system between the pilot and ground personnel. A method for reducing aircraft turnaround time by improving ramp safety is not specifically suggested, however.

McCoskey et al also describes a powered nose aircraft wheel system useful in a method of taxiing an aircraft that can minimize the assistance needed from tugs and the aircraft engines in U.S. Pat. No. 7,445,178. A precision guidance system is disclosed for controlling movement of the aircraft on the ground to minimize collision damage during taxi. Reducing aircraft turnaround time by enhancing ramp safety is not suggested.

The prior art, therefore, has not directly recognized a connection between improved ramp safety and reduced aircraft turnaround times and does not disclose a method for simultaneously reducing aircraft turnaround time by improving ramp safety.

SUMMARY OF THE INVENTION

It is a primary object of the present invention, therefore, to provide a method for simultaneously reducing aircraft turnaround time by improving airport ramp safety.

It is another object of the present invention to provide a method for simultaneously reducing aircraft turnaround time by improving ramp safety that eliminates the sources of jet blast in the ramp area.

It an additional object of the present invention to provide a method for simultaneously reducing aircraft turnaround time by improving ramp safety that eliminates the sources of engine ingestion in the gate area.

It is a further object of the present invention to provide a method for simultaneously reducing aircraft turnaround time by improving ramp safety that eliminates the need for tugs or tow vehicles in the ramp area.

It is yet another object of the present invention to provide a method for simultaneously reducing aircraft turnaround times by improving ramp safety that provides a method for safely moving an aircraft on the ground in the ramp area without assistance from the aircraft's engines.

In accordance with the aforesaid objects, a method for simultaneously reducing aircraft turnaround times by improving ramp safety is provided that eliminates the requirement for an aircraft tug for pushback prior to takeoff while also eliminating the sources of and hazards from jet blast and the possibility of engine ingestion in the ramp area. The present method equips an aircraft with an onboard electric drive powering at least one aircraft drive wheel with power from a source that does not require the operation of any of the aircraft's main engines. Movement of the aircraft on the ground is controlled solely by the operation of this electric driver-powered drive wheel in conjunction with the aircraft flight crew or, alternatively, remotely.

Ramp safety is improved as the aircraft's ground movement does not require operating jet engines, thereby eliminating the hazards that accompany jet blast and the potential for engine ingestion. Moreover, passengers can safely disembark and cargo can be removed from the aircraft as soon as the aircraft stops, significantly reducing turnaround time. Ramp safety is further improved by the elimination of tug or tow tractors, which significantly reduces the number of ground vehicles in the ramp area. The time formerly required to attach and then detach a tow vehicle or to wait for the aircraft engines to be turned off prior to carrying out arrival procedures is also eliminated.

Other objects and advantages will be apparent from the following description, claims, and drawing.

DETAILED DESCRIPTION OF THE INVENTION

Figure 1:
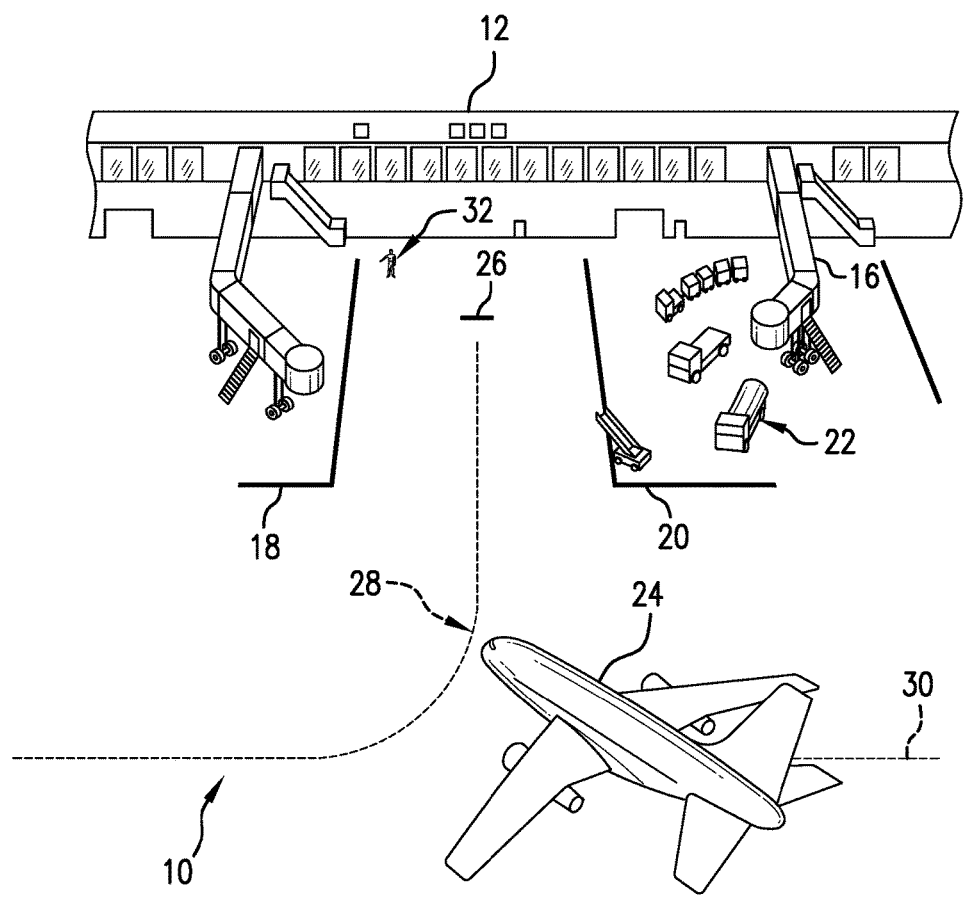
FIG. 1 illustrates an aircraft ramp area with an aircraft entering the gate area.

Suggestions have been made to reduce the time required for an aircraft to land, taxi to a gate or parking location adjacent to an air terminal, unload arriving passengers and/or cargo, service the aircraft, load departing passengers and/or cargo, pushback from the gate or parking location, taxi to a runway, and take off. Minimizing this turnaround time, as discussed above, has many advantages for an airline. Unfortunately, moving an aircraft from landing to takeoff as quickly as possible has the potential to compromise ramp safety. Achieving and maintaining a safe ramp environment where the likelihood of damage or injury caused by aircraft to ground vehicles or other aircraft or to people can be reduced while simultaneously minimizing turnaround time appears to be possible only with the method of the present invention.

The present method is able to minimize the total time required to move an aircraft from an initial taxi point on a runway after landing to arrival at a parking location at the ramp area where arriving passengers and/or cargo are unloaded and the aircraft serviced, departing passengers and/or cargo are loaded, the aircraft is moved away from the parking location and taxis to a departure point for takeoff without assistance from the aircraft engines or from either tugs or tow vehicles. Because the aircraft engines are not required to be operational during this time, the jet blast hazard is eliminated. There is, in addition, no likelihood of engine ingestion when the engines are not operating. Moreover, because engine noise is also eliminated, communication among ground personnel is improved. The time previously required to locate and attach a tug for pushback upon departure, to maneuver the aircraft with the tug to push it back from the parking location, and then to detach the tug after pushback is not needed and does not have to be factored into the turnaround time. Tugs and tow vehicles can be removed from the fleet of necessary ground equipment required to service aircraft, eliminating this source of ramp congestion, as well as the numerous unfortunate accidents that occur between these vehicles and aircraft.

The cockpit crew controls the ground movement of the aircraft and can operate the aircraft in conjunction with ground crew more safely during turnaround without having to worry about the logistics of dealing with tugs or operating engines producing jet blast or engine ingestion hazards. Not only is the likelihood of harm to ground personnel reduced or eliminated, but the number of ground personnel required for ground operations can be reduced. When cameras are available, pilots will have complete situational awareness, which can reduce ground personnel requirements further.

An aircraft useful in the method of the present invention is equipped with at least one drive wheel powered by a controllable onboard electric drive motor capable of moving the aircraft independently as required on the ground between landing and takeoff. An electric drive motor preferred in the present method will be mounted in driving relationship with one or more of the aircraft wheels to move the wheels at a desired speed and torque. Electric drive motors useful for this purpose may be selected from those known in the art. One drive motor preferred for this purpose is a high phase order electric motor of the kind described in, for example, U.S. Pat. Nos. 6,657,334; 6,838,791; 7,116,019; and 7,469,858, all of which are owned in common with the present invention. A geared motor, such as that shown and described in U.S. Pat. No. 7,469,858, is designed to produce the torque required to move a commercial sized aircraft at an optimum speed for ground movement. The disclosures of the aforementioned patents are incorporated herein by reference.

Any type of motor capable of driving an aircraft on the ground, including but not limited to electric induction motors, permanent magnet brushless DC motors, switched reluctance motors, hydraulic pump/motor assemblies, and pneumatic motors may also be used. Other motor designs capable of high torque operation across a desired taxi speed range that can be integrated into an aircraft drive wheel, or located to drive an aircraft drive wheel, to function as described herein may also be suitable for use in reducing turnaround time by improving ramp safety according to the method of the present invention.

As indicated, the pilot or flight crew directs the ground movement of the aircraft between the runway and the ramp. Power for the preferred onboard electric drive motor does not require operation of the aircraft engines to move the aircraft either into or out of the ramp area, thereby effectively eliminating the hazards associated with both jet blast and engine ingestion. Power for the preferred electric motor is preferably supplied by the aircraft auxiliary power unit (APU) and may also be supplied by any suitable source of electric power. Additionally, neither tugs nor tow vehicles are required to move the aircraft in the ramp area or during other ground movement.

FIG. 1 illustrates a typical airport ramp operations area 10 outside an airport terminal 12 with adjacent jet ways or air bridges 14, 16. Foul lines 18, 20 may define the boundaries of the ramp area that should not be crossed by unauthorized ground personnel or ground equipment and vehicles, designated by 22, until the aircraft 24 is parked at a stop location 26. The aircraft 24 is shown in a taxi location after landing just outside the ramp gate entry/exit area 28 taxiing along a path 30, guided to the stop location 26 by a ground controller 32. Upon departure, the aircraft 26 must move in reverse from the stop location 26 to the gate entry/exit location 28, and then to a point beyond the ramp area (not shown) where the aircraft can turn and begin to taxi in a forward direction to a runway for takeoff.

It has been determined that almost three quarters of the ramp incidents identified occur upon entry into or exit from the gate (area 28) and in the gate stop area between area 28 and stop location 26. Examples of the types of incidents the method of the present invention can prevent include an incident in which a mechanic and an engine part were blown off a maintenance stand by an aircraft turning into a gate entry area on arrival with engines operating, and another incident in which a small aircraft was blown over upon power pushback by a commercial aircraft. In addition to these examples of jet blast hazards, engine ingestion is more likely to occur when an aircraft is parked with the engines running, even at idle speeds. Other types of ramp incidents have involved improperly attached or operated tugs. These types of ramp incidents can be avoided by the method of the present invention. An aircraft equipped with an onboard electric drive motor that moves the aircraft independently on the ground into and out of the ramp area while the aircraft's engines are not operating will not produce the jet blast that was responsible for the aforementioned incidents or cause engine ingestion incidents. The area around the aircraft's engines where engine ingestion is likely to occur, moreover, will no longer be an off-limits hazard area. Since the present method does not use tugs and tow vehicles to move aircraft, damage associated with tug attachment, detachment, and/or operation will not occur. Completely eliminating the causes for incidents such as those described above will result in substantial improvements to ramp safety.

Figure 2:
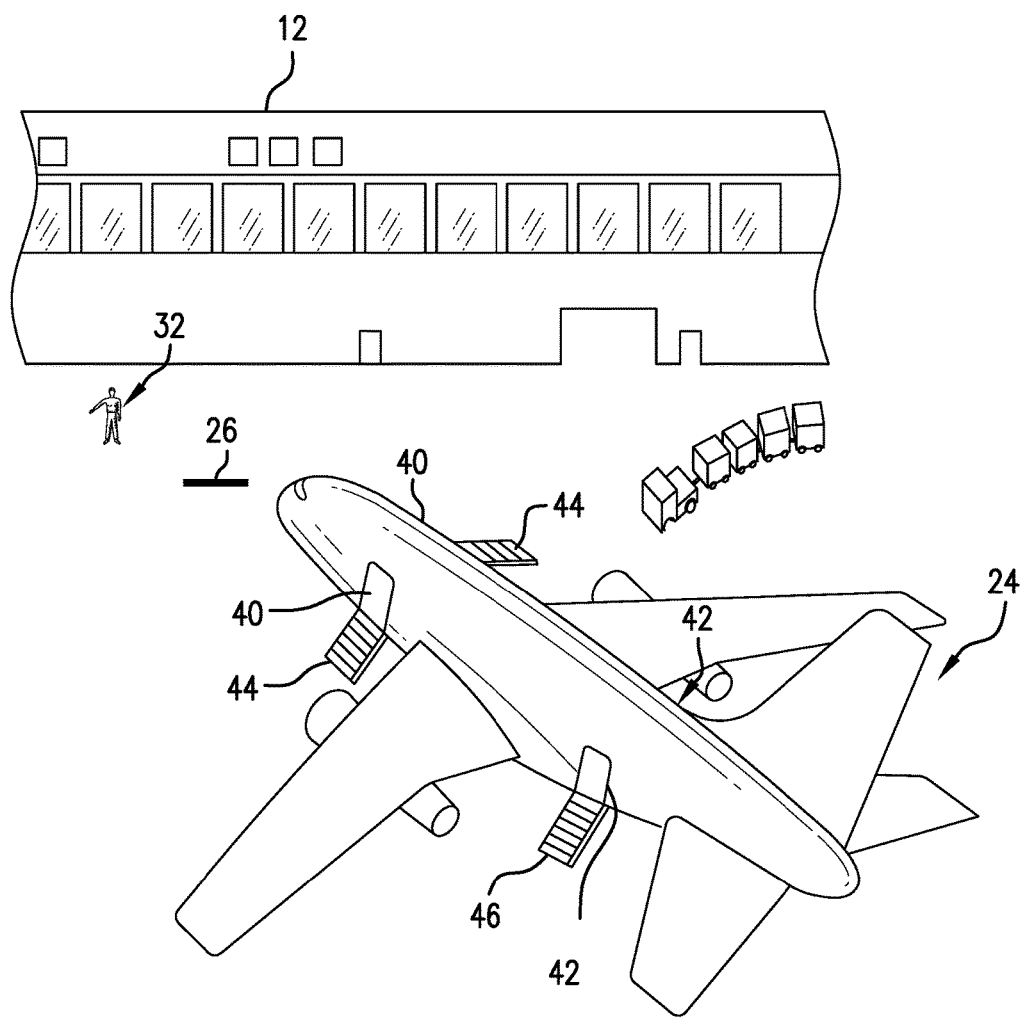
FIG. 2 illustrates the aircraft of FIG. 1 parked at an airport that does not have jet ways or air bridges with visible forward and rear exit doors open and stairs extended from the aircraft

There are many airports throughout the world that do not have the jet ways or air bridges shown in FIG. 1 to connect the interior of the aircraft with the interior of the airport terminal. At these airports, passengers and crew departing or boarding an aircraft go outside the terminal and walk through the ramp area. Passengers and crew must also use stairs located at the forward and/or rear doors to board the aircraft. In the past, aircraft crew could not open the doors or lower the stairs upon arrival until the aircraft engines were turned off without risking damage to the stairs or injury to passengers or crew. This waiting time contributes to the overall time required for turnaround. At some airports, passengers are permitted to leave and board the aircraft from both forward and rear exits and stairs, which should shorten departure and boarding times. Until the present invention, however, the time saving benefits of using both exits could not be fully realized until the aircraft engines were completely shut off. Now, as soon as the aircraft comes to a full stop, both exits can be opened, the stairs can be lowered, and passengers can immediately leave or board the aircraft using both access locations, which takes much less time than using only a single exit to unload the aircraft. FIG. 2 shows the aircraft 24 of FIG. 1 parked at the stop location 26 an airport terminal 12. As discussed above, both forward exit doors 40 and rear exit doors 42 can be used for passenger and crew departing or boarding the aircraft 24 by stairs 44 and 46 located, respectively, at the access locations of the forward and rear doors, as shown in FIG. 2.

Aircraft servicing between arrival and departure can also be performed more quickly than in the past. Service personnel can focus more quickly and efficiently on what needs to be checked and serviced during the turnaround time period to ready the aircraft for departure instead of being worried about getting too close to an engine inlet hazard zone and sucked into the engine nacelle.

The method for reducing aircraft turnaround times by improving ramp safety described herein has been described with respect to preferred embodiments. Other, equivalent, structures and processes are also contemplated to be within the scope of the present invention.

INDUSTRIAL APPLICABILITY

The method of the present invention will find its primary applicability for use by airlines and airports when it is desired simultaneously to minimize the amount of time required between landing and takeoff of an aircraft and to maximize safety in an airport ramp area.

The invention claimed is:

1. A method for maximizing safety in an airport ramp area where multiple aircraft, ground vehicles, and people are moving into, within, and out of the ramp area and simultaneously minimizing turnaround time of aircraft traveling into and out of the ramp area to unload and load passengers and cargo, comprising:
  a. at an airport with a ramp area having entry and exit locations and parking locations for aircraft and boundaries defining ground hazard zones that limit presence of unauthorized persons and vehicles, equipping aircraft to move into, within, and out of the ramp area independently without operating aircraft engines and without assistance from tow vehicles by providing at least one landing gear drive wheel powered by a drive motor controllable by a pilot or cockpit crew to move the aircraft;
  b. driving the aircraft through a ramp area entry location to one of the parking locations with only the controllable powered drive motor without hazards from jet blast and engine ingestion from the aircraft as the aircraft is driven into and within the ramp area;
  c. unloading passengers from both forward and rear access doors and stair ramps on opposite sides of the aircraft immediately after the aircraft stops at the parking location and loading passengers through the both forward and rear access doors and stair ramps on the opposite sides of the aircraft without delays caused by jet blast or engine ingestion; and
  d. driving the aircraft away from the parking location and through a ramp exit location with only the controllable powered drive motor without hazards from jet blast and engine ingestion from the aircraft as the aircraft is driven within and out of the ramp area.

2. The method of claim 1, further comprising immediately after the aircraft stops at the parking location, unloading and loading cargo and servicing the aircraft during passenger transfer without jet blast and engine ingestion hazards and with reduced risk of ground incidents.

3. The method of claim 1, further comprising eliminating engine operation in all aircraft moving into, within, and out of the ramp area and parking at parking locations in the ramp area and eliminating a possibility of engine ingestion and jet blast in the vicinity of the aircraft moving and parked in the ramp area.

4. The method of claim 1, further comprising providing the drive motor as an onboard electric drive motor selected from the group comprising high phase order electric motors, electric induction motors, permanent magnet brushless DC motors, and switched reluctance motors powered by a power source other than the aircraft main engines.

5. The method of claim 1, wherein the drive motor comprises a hydraulic pump/motor assembly or a pneumatic motor powered by power sources other than the aircraft main engines.

6. The method of claim 1, further comprising simultaneously reducing a time interval between the aircraft's arrival at and departure from the parking location in the ramp area and minimizing an occurrence of incidents by driving the aircraft with only the controllable powered drive motor in the ramp area.

7. The method of claim 1, further comprising eliminating the ground hazard zones defined in the ramp area adjacent to parked aircraft and associated with jet blast and engine ingestion by driving the aircraft at the airport into, within, and out of the ramp area with only the controllable powered drive motors.

8. The method of claim 1, further comprising, as soon as the aircraft has come to a complete stop upon arrival at the parking location, maximizing use of all the both forward and rear access doors and stair ramps on the opposite sides of the aircraft for unloading arriving passengers and cargo and for loading departing passengers and cargo, simultaneously unloading the arriving passengers and cargo, and simultaneously loading the departing passengers and cargo, thus reducing time for passenger and cargo transfer during aircraft turnaround.

9. The method of claim 1, further comprising minimizing turnaround time by driving the aircraft out of the parking location and out of the ramp exit location with only the controllable powered drive motors, thus eliminating time required for a tow vehicle to be first attached to and then detached from the aircraft to move the aircraft out of the parking location and out of the ramp exit location.

10. The method of claim 1, further comprising improving ramp safety in the vicinity of the aircraft by driving the aircraft with only the controllable powered drive motors within the ramp, thus decreasing a likelihood of ramp incidents involving ground vehicles, persons, and aircraft.

11. The method of claim 1, further comprising driving the aircraft with only the controllable powered drive motors through the ramp area and parking the aircraft in the parking location, thus eliminating the boundaries defining ground hazard zones adjacent to the driven and parked aircraft.

\* \* \* \* \*